(12) United States Patent
Blaxland et al.

(10) Patent No.: US 9,073,733 B2
(45) Date of Patent: Jul. 7, 2015

(54) DEPLOYMENT APPARATUS AND METHOD OF DEPLOYING AN UNDERWATER POWER GENERATOR

(75) Inventors: Drew Blaxland, Singapore (SG); David Rigg, Singapore (SG)

(73) Assignee: Atlantis Resources Corporation PTE Limited, Singapore (SG)

( * ) Notice: Subject to any disclaimer, the term of this patent is extended or adjusted under 35 U.S.C. 154(b) by 0 days.

(21) Appl. No.: 14/115,821

(22) PCT Filed: May 10, 2012

(86) PCT No.: PCT/AU2012/000503
§ 371 (c)(1),
(2), (4) Date: Nov. 5, 2013

(87) PCT Pub. No.: WO2012/151631
PCT Pub. Date: Nov. 15, 2012

(65) Prior Publication Data
US 2014/0138973 A1 May 22, 2014

(30) Foreign Application Priority Data
May 10, 2011 (AU) ................................ 2011901759

(51) Int. Cl.
*B66C 1/66* (2006.01)
*B63C 7/16* (2006.01)
(Continued)

(52) U.S. Cl.
CPC ... *B66C 1/66* (2013.01); *B63C 7/16* (2013.01); *F04D 29/607* (2013.01); *B66C 1/10* (2013.01);
(Continued)

(58) Field of Classification Search
CPC ............ B66C 1/66; F04D 29/607; B63C 7/16; B63C 7/20

USPC ............ 294/81.4, 81.41, 81.54, 81.62, 82.23, 294/82.35, 67.1, 67.33, 66.1, 66.2; 414/142.8; 405/195.1, 224
See application file for complete search history.

(56) References Cited

U.S. PATENT DOCUMENTS 3,479,828 A 11/1969 Luque
4,078,388 A 3/1978 Atencio
(Continued)

FOREIGN PATENT DOCUMENTS

DE         195 01 414 A1    7/1996
DE   10 2008 000382       9/2009
(Continued)

OTHER PUBLICATIONS

Swenson, W. J., "The Evaluation of an Axial Flow, Lift Type Turbine for Harnessing the Kinetic Energy in a Tidal Flow," Northern Territory Centre for Energy Research, Northern Territory University, Darwin, Australia, Sep. 1999.
(Continued)

*Primary Examiner* — Dean Kramer

(57) ABSTRACT

A deployment apparatus is described. The deployment apparatus is for deploying an underwater power generator having a power generating main body from a deployment vessel disposed on the surface of a body of water onto a pylon disposed on the bed of the body of water and the deployment apparatus includes: a frame including one or more connectors disposed on a base region of the frame, the connectors for releasable connection to catches disposed on an upper region of the power generating main body, the connectors being remotely operable between a connected position in which the connectors are engaged with the catches and a disconnected position in which the connectors are disengaged from the catches; and one or more cameras disposed on the frame for providing visual guidance to the vessel of the position of the underwater power generator relative to the pylon. A method for deployment of the underwater power generator is also described.

20 Claims, 14 Drawing Sheets

(51) Int. Cl.

| | |
|---|---|
| *F04D 29/60* | (2006.01) |
| *B66C 1/10* | (2006.01) |
| *B66C 13/08* | (2006.01) |
| *F03B 13/10* | (2006.01) |
| *E02B 9/08* | (2006.01) |
| *E02B 17/04* | (2006.01) |

(52) U.S. Cl.
CPC ............... *B66C 13/08* (2013.01); *F03B 13/10* (2013.01); *F05B 2230/61* (2013.01); *F05B 2240/97* (2013.01); *Y02E 10/22* (2013.01); *E02B 9/08* (2013.01); *E02B 17/04* (2013.01); *Y02E 10/28* (2013.01); *Y02E 10/38* (2013.01)

(56) References Cited

U.S. PATENT DOCUMENTS

| | | | |
|---|---|---|---|
| 4,106,302 A | 8/1978 | Vogel | |
| 4,109,477 A | 8/1978 | Vogel | |
| 4,207,015 A | 6/1980 | Atencio | |
| 4,214,842 A * | 7/1980 | Franks | 405/191 |
| 4,386,874 A * | 6/1983 | Engelsen et al. | 405/224 |
| 4,397,578 A | 8/1983 | Inman | |
| 4,444,528 A * | 4/1984 | Scodino et al. | 405/173 |
| 4,523,878 A | 6/1985 | Richart et al. | |
| 4,674,915 A * | 6/1987 | Shatto, Jr. | 405/191 |
| 5,069,580 A | 12/1991 | Herwig et al. | |
| 5,440,176 A | 8/1995 | Haining | |
| 5,522,631 A * | 6/1996 | Halonen | 294/66.1 |
| 5,580,113 A * | 12/1996 | Pomerville et al. | 294/82.35 |
| 5,667,341 A * | 9/1997 | Kuehn | 405/228 |
| 5,954,474 A | 9/1999 | Fisher et al. | |
| 6,036,246 A * | 3/2000 | Liedtke | 294/66.1 |
| 6,091,161 A | 7/2000 | Dehlsen et al. | |
| 6,652,221 B1 | 11/2003 | Praenkel | |
| 7,199,484 B2 | 4/2007 | Brashears | |
| 7,352,074 B1 | 4/2008 | Pas | |
| 7,372,172 B2 | 5/2008 | Winkler et al. | |
| 7,859,128 B2 | 12/2010 | Gibberd et al. | |
| 7,902,687 B2 | 3/2011 | Sauer et al. | |
| 7,976,084 B2 * | 7/2011 | Mogedal et al. | 294/66.1 |
| 2003/0126751 A1 | 7/2003 | Izumi | |
| 2004/0070210 A1 | 4/2004 | Johansen et al. | |
| 2004/0219015 A1 | 11/2004 | Winkler et al. | |
| 2006/0087137 A1* | 4/2006 | Mongan | 294/82.35 |
| 2007/0231072 A1 | 10/2007 | Jennings et al. | |
| 2007/0231117 A1 | 10/2007 | Gokhman | |
| 2007/0241566 A1 | 10/2007 | Kuehnle | |
| 2007/0284882 A1 | 12/2007 | Costin | |
| 2008/0056906 A1 | 3/2008 | Gray et al. | |
| 2008/0138206 A1 | 6/2008 | Corren | |
| 2009/0045631 A1 | 2/2009 | Gibberd et al. | |
| 2009/0123283 A1 | 5/2009 | Corren et al. | |
| 2009/0302611 A1 | 12/2009 | Masters et al. | |
| 2010/0084925 A1 | 4/2010 | Draper et al. | |
| 2010/0119309 A1 | 5/2010 | Gibberd et al. | |
| 2011/0176915 A1 | 7/2011 | Keir et al. | |
| 2011/0210548 A1 | 9/2011 | Sevenster et al. | |
| 2012/0013129 A1 | 1/2012 | Cornelius et al. | |
| 2012/0133140 A1 | 5/2012 | Cornelius et al. | |
| 2012/0191265 A1 | 7/2012 | Keir | |
| 2012/0200084 A1 | 8/2012 | Blaxland et al. | |
| 2012/0202369 A1 | 8/2012 | Blaxland | |
| 2012/0267895 A1 | 10/2012 | Blaxland | |
| 2012/0280507 A1 | 11/2012 | Keir | |
| 2014/0033624 A1 | 2/2014 | Blaxland et al. | |

FOREIGN PATENT DOCUMENTS

| | | |
|---|---|---|
| DE | 10 2008 046 005 A1 | 3/2010 |
| EP | 1 205 422 A1 | 5/2002 |
| EP | 2 122 160 | 11/2009 |
| EP | 2 450 562 A1 | 5/2012 |
| FR | 2 702 784 | 9/1994 |
| GB | 2 426 295 | 11/2006 |
| GB | 2 431 207 A | 4/2007 |
| GB | 2 437 533 | 10/2007 |
| GB | 2 437 534 | 10/2007 |
| GB | 2 448 710 | 3/2009 |
| JP | 62-101736 | 5/1987 |
| JP | 06-264701 | 9/1994 |
| JP | 2617276 | 6/1997 |
| JP | 2001-020849 | 1/2001 |
| JP | 2002-97651 | 4/2002 |
| JP | 2003-226484 A1 | 8/2003 |
| JP | 2006-508290 | 3/2006 |
| JP | 2009-240021 | 10/2009 |
| JP | 2009-281288 | 12/2009 |
| WO | WO 2004/022968 A1 | 3/2004 |
| WO | WO 2007/125349 A2 | 11/2007 |
| WO | WO 2008/060070 A1 | 5/2008 |
| WO | WO 2008/129311 | 10/2008 |
| WO | WO 2005/045243 A1 | 5/2009 |
| WO | WO 2010/003596 A1 | 1/2010 |

OTHER PUBLICATIONS

Sharkh, SM Abu, et al., "Performance of an Integrated Water Turbine PM Generator," Proceedings of the 14th Interntional Symposium on Power Semiconductor Devices & ICS, pp. 486-491, Apr. 2002.
Schönborn, et al., "Development of a Hydraulic Control Mechanism for Cyclic Pitch Marine Current Turbines," Renewable Energy, Pergamon Press, Oxford, GB, vol. 32, No. 4, pp. 662-679, Apr. 2006.
Supplemental European Search Report for European Patent Application No. 10825848.4 mailed Mar. 28, 2013.
Office Action for U.S. Appl. No. 13/502,591, mailed Aug. 30, 2013.
Examination Report for Australian Patent Application No. 2011288967, issued Aug. 23, 2012.
International Preliminary Report on Patentability for International Patent Application No. PCT/AU2012/000503, mailed Mar. 13, 2013.
Final Office Action for U.S. Appl. No. 13/502,591, mailed Mar. 13, 2014.
Office Action for U.S. Appl. No. 13/502,593, mailed Jan. 13, 2014.
Office Action for U.S. Appl. No. 13/816,032, mailed Jan. 31, 2014.
Supplementary European Search Report and Opinion for European Patent Application No. 10 82 5849, issued Apr. 5, 2013.
Office Action for U.S. Appl. No. 13/502,591, mailed Aug. 7, 2014.
English Translation of Office Action for Chinese Patent Application No. 201180039279.9 mailed Jul. 2, 2014.
Final Office Action for U.S. Appl. No. 13/816,032, mailed Aug. 20, 2014.
English Translation of Office Action for Korean Patent Application No. 10-2013-7032701, mailed Aug. 19, 2014.
English Translation of Office Action for Japanese Patent Application No. 2012-534502, mailed Aug. 7, 2014.
English Translation of Japanese Office Action for Japanese Patent Application No. 2012-535546, mailed Aug. 7, 2014.
Office Action for U.S. Appl. No. 13/816,032, mailed Jan. 16, 2015.
Extended European Search Report for European Patent Application No. 12781647.8, mailed Dec. 16, 2014.
English Translation of Office Action for Japanese Patent Application No. 2013-523434, mailed Jan. 6, 2015.
Final Office Action for U.S. Appl. No. 13/502,591, mailed Feb. 24, 2015.

* cited by examiner

US 9,073,733 B2

DEPLOYMENT APPARATUS AND METHOD OF DEPLOYING AN UNDERWATER POWER GENERATOR

CROSS REFERENCE TO RELATED APPLICATIONS

This application, which is a national stage filing under 35 U.S.C. §371 of International Patent Application No. PCT/AU2012/00503, filed May 10, 2012, claims priority under 35 U.S.C. §365 to Australian Patent Application No. 2011901759, filed May 10, 2011, each of which is entitled "Deployment Apparatus and Method of Deploying an Underwater Power Generator," and the disclosure of each of which is hereby incorporated by reference in its entirety.

FIELD OF THE INVENTION

The present invention relates generally to apparatus for deployment of underwater power generators, and methods of deploying underwater power generators.

BACKGROUND OF THE INVENTION

Underwater power generators convert the energy of flowing marine and water currents into usable power, which is generally electrical power. The generators are generally difficult to install on valuable sites because powerful marine currents at those valuable sites flow all the time, or most of the time.

Generally speaking, forces generated by the currents are very high, increasing the stresses on, and hence the weight of, deployment components. This hampers deployment and installation of the turbine.

Furthermore, the underwater power generators, when deployed, are sited at least tens of meters under the water surface which makes deployment of the underwater power generators difficult and expensive. Accurate siting and positioning of the underwater power generator relative to other generator components, and relative to prevailing tidal currents is difficult when much of the major equipment for use in the deployment is above the surface of the water body, well away from the bed of the water body.

The present invention provides a useful alternative to known deployment apparatus and methods.

In this specification, where a document, act or item of knowledge is referred to or discussed, this reference or discussion is not an admission that the document, act or item of knowledge or any combination thereof was at the priority date:

(a) part of common general knowledge; or
(b) known to be relevant to an attempt to solve any problem with which this specification is concerned.

SUMMARY OF THE INVENTION

In accordance with a first aspect of the present invention there is provided a deployment apparatus for deploying an underwater power generator having a power generating main body from a deployment vessel on the surface of a body of water, onto a pylon on the bed of the body of water, the deployment apparatus including:

a frame including one or more connectors disposed on a base region of the frame, the connectors for releasable connection to respective catches disposed on an upper region of the power generating main body, the connectors being remotely operable between a connected position in which the connectors are engaged with the respective catches and a disconnected position in which the connectors are disengaged from the respective catches; and one or more cameras disposed on the frame for providing visual guidance to the deployment vessel of the position of the underwater power generator relative to the pylon.

Preferably the frame includes structural elements opposed to one another and spaced apart from one another in the form of stiles and rungs to form a ladder frame arrangement. The ladder frame facilitates positioning of the power generating main body.

Preferably the frame includes guides disposed on the frame for receiving guide cables in use connected to a base region of the pylon so that in use the frame may be lowered down the guide cables into a selected position. Preferably the guides include one or more apertures through which the guidance cables extend when in use.

Preferably the connectors are load bearing. Preferably the connectors include connector pins receivable in the catches. Preferably the catches include lifting padeyes. Preferably the or each connector pin extends from a first padeye disposed on the frame, through a middle catch padeye on the upper region of the power generating main body, to a second padeye disposed on the frame at a location spaced from the first padeye when the pin is in the connected position.

Preferably the connector pins are actuated by hydraulic fluid under pressure delivered by a hydraulic line extending from the deployment vessel on the surface of the body of water to the frame. Preferably the frame includes a manifold for distributing the hydraulic fluid to various parts of the frame.

Preferably the frame includes a hot stab connection for connecting the hydraulic line to the power generating main body so that the deployment vessel may power other services on the underwater power generator such as for example a hydraulic circuit which facilitates the extension and retraction of a wet mating device so that electrical services are connected between the power generating main body and an electricity grid on shore.

Preferably there are provided cameras on the power generating main body and these cameras are powered by electrical services running along the hydraulic line and connected through a hot stab on the frame and power generating main body. The cameras are to provide other visual information from other angles.

Preferably the frame includes an alignment device for aligning the frame with the power generating main body during recovery of the power generating main body. In one preferred form the alignment device includes at least one generally conical receiver on the frame to receive a boss on the power generating main body. Alternative embodiments may include the reverse arrangement where the boss is on the frame and the generally conical receiver is on the power generating main body. Preferably the alignment device includes a single generally conical receiver disposed at a central region of the frame although it is contemplated that two receivers could be useful, and each receiver could be disposed at opposed ends of the frame. The alignment device in use is to facilitate a fast and accurate alignment of the connectors with the receivers during reattachment of the frame to the power generating main body as the first step in its recovery from the bed of the body of water. The alignment device also facilitates accurate connection with the hot stab. Preferably the alignment device is disposed at an upper portion of the frame.

Preferably shear pins are provided, which are intended to shear in use at a lower shear force than the locking pins, either by virtue of being constructed from a weaker material or by virtue of having weakened zones. In use, the shear pins may be inserted through the padeyes instead of the locking pins. Therefore, if a locking pin is unable to be retracted from its padeye, the shear pins are driven into the padeye and then the frame is drawn upwards to cause it to tear away from the generator. During this tearaway process, the shear pins are intended to catastrophically fail so that the frame is retrieved but the generator remains on the pylon.

Preferably the frame includes docks for docking submersible remotely operated vehicles (ROVs).

Preferably the frame includes a rotating means for facilitating rotation of one portion of the frame relative to another about a vertical axis. Preferably the rotating means include one or more positioning cables, connected to the frame padeyes.

Preferably the one or more cameras are video cameras.

The one or more cameras, preferably being video cameras, may be disposed on the rungs on an outward-facing portion of the rungs to facilitate a wide field of view of the power generating main body and pylon which it is approaching. Preferably the cameras are electrically connected to the deployment vessel by an electrical cable extending from the deployment vessel to the frame to facilitate images being sent to the deployment vessel.

According to a second aspect of the present invention there is provided a method of deploying an underwater power generator from a deployment vessel to a pylon, the method including the steps of:

releasably connecting a lower region of a frame of a deployment apparatus according to a first aspect of the present invention to an upper region of a power generating main body;

lowering the frame and power generating main body onto an underwater power generating main body support;

relaying images of the relative positioning of the power generating main body and the pylon so as to provide feedback on the progress of the lowering step;

remotely releasing the frame from the power generating main body.

According to another aspect of the present invention there is provided a method of deploying an underwater power generator from a deployment vessel to a pylon, the method including the steps of:

releasably connecting a lower region of a frame to an upper region of a power generating main body;

lowering the frame and power generating main body onto an underwater power generating main body support;

relaying images of the relative positioning of the power generating main body and the pylon so as to provide feedback on the progress of the lowering step;

remotely releasing the frame from the power generating main body.

Preferably the deployment vessel includes a dynamic positioning system which facilitates the accurate positioning of the deployment vessel without the use of an anchor.

Preferably the deployment vessel includes a crane to lower the frame and the power generating main body. Preferably the method includes the step of lowering the frame and power generating main body by the crane. Preferably the crane includes a slewing feature so that the crane can slew along a deck of the dynamic positioning vessel to alter the positioning of the power generating main body relative to the pylon.

BRIEF DESCRIPTION OF THE DRAWINGS

To improve understanding, a preferred embodiment of the present invention will now be further explained and illustrated by reference to the accompanying drawings, in which.

DETAILED DESCRIPTION OF A PREFERRED EMBODIMENT

Figure 1:
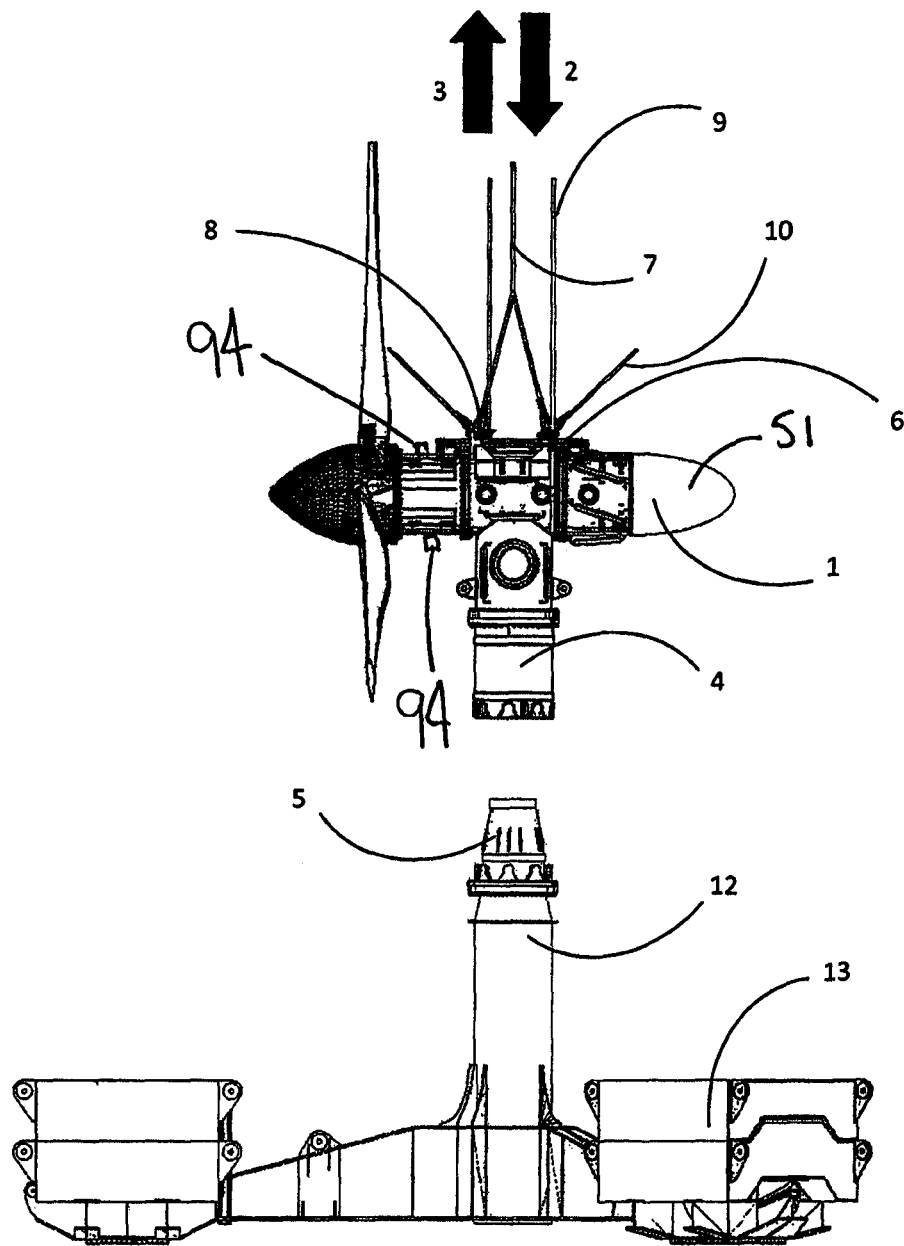
FIG. 1 is a side elevation view of a power generator main body and a support structure, the Figure showing arrangement of the two structures during deployment of the power generator main body to a mounted position on a support structure pylon.
Figure 2:
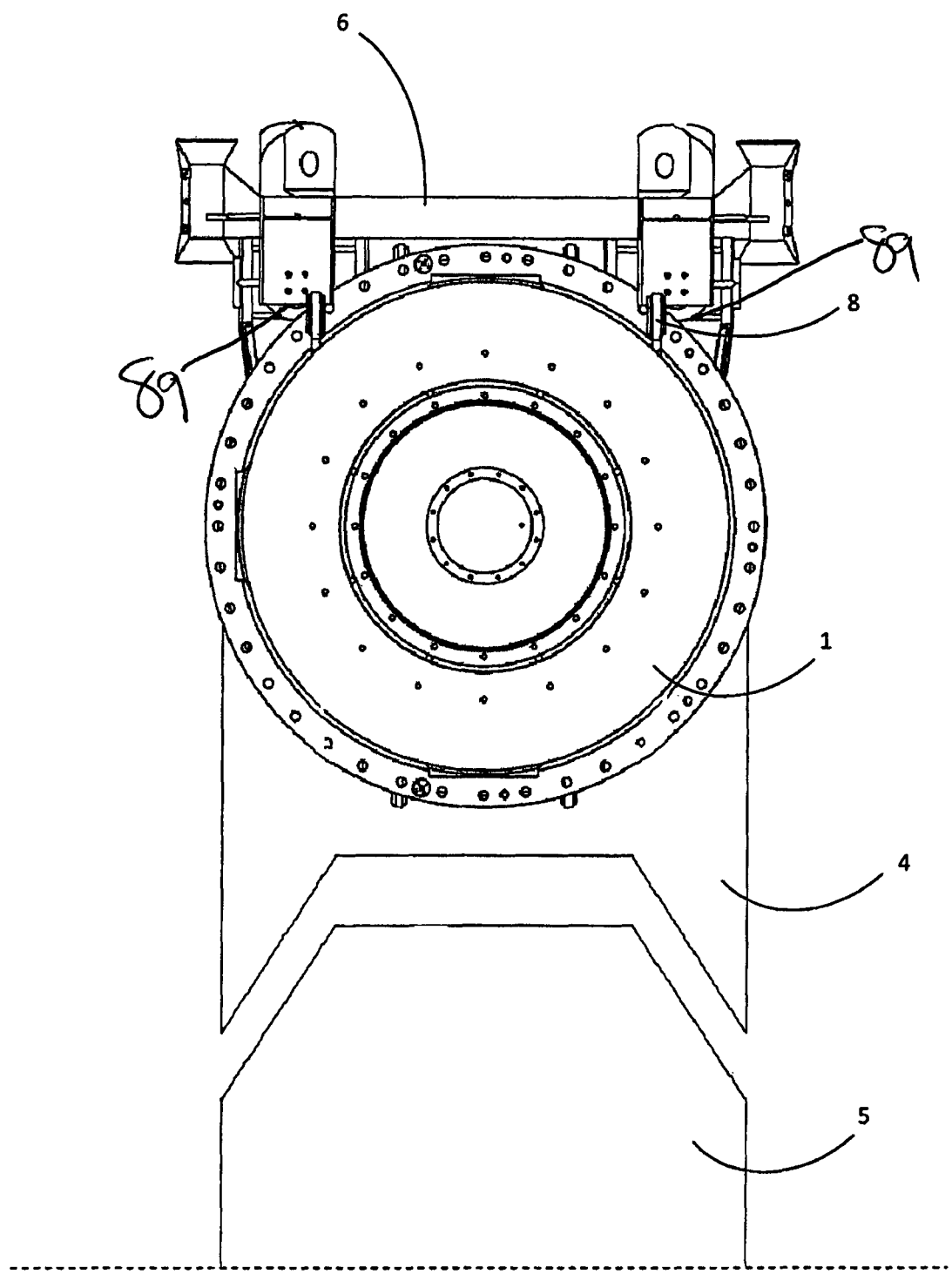
FIG. 2 is an end elevation view of the turbine and the stab connector on which it is to be deployed just before the main body and support structure pylon adopt a mating position.
Figure 3:
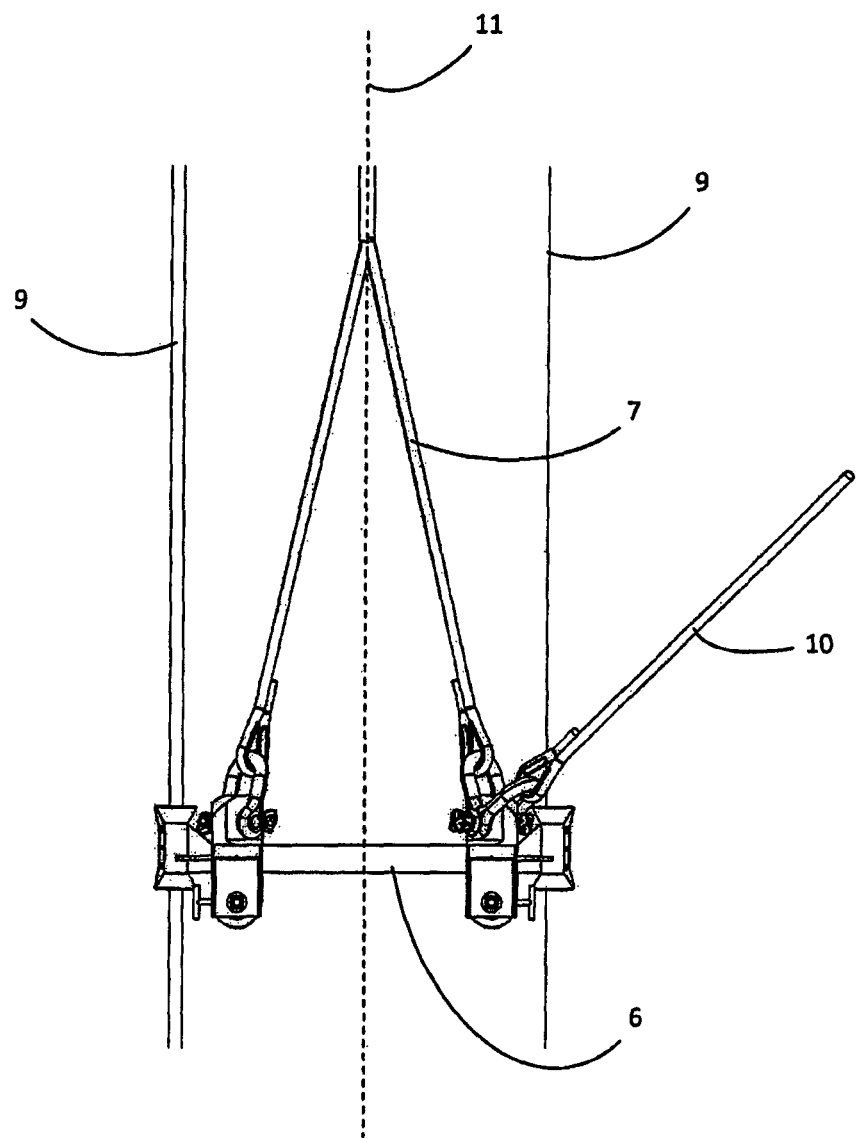
FIG. 3 is a side elevation view of an installation frame according to a preferred embodiment of the present invention, associated with cable guide lines, wires and lifting cables.
Figure 4:
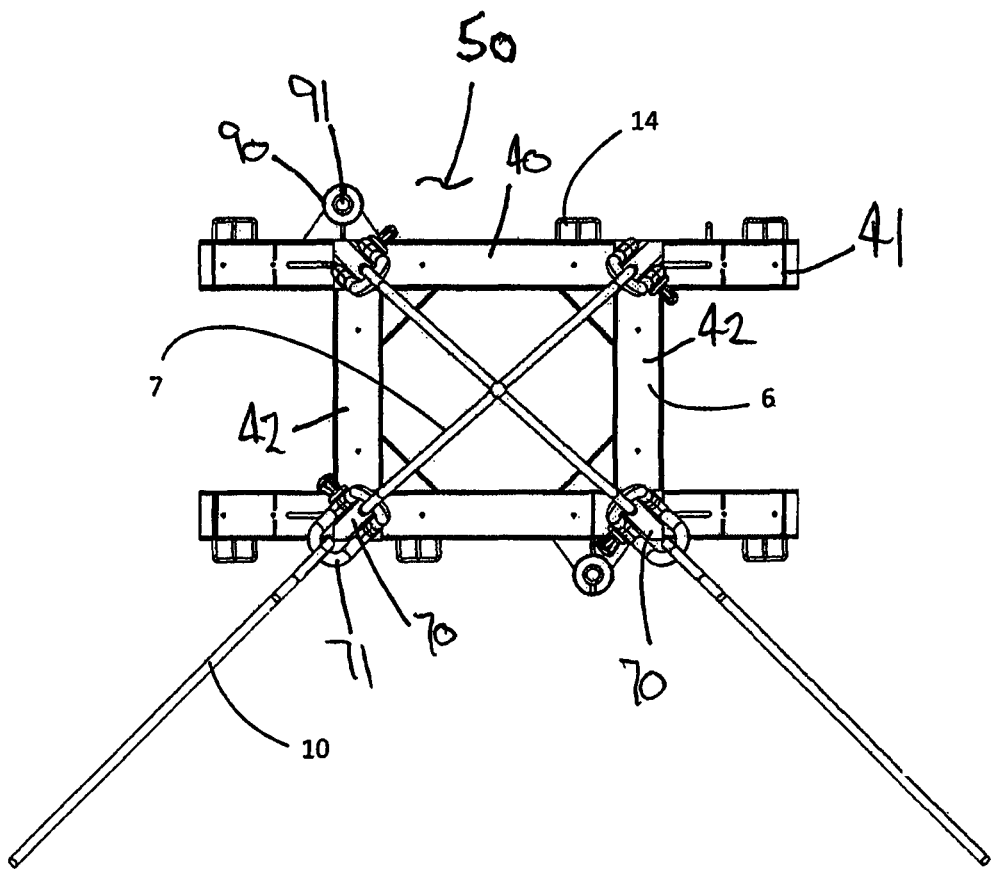
FIG. 4 is a plan view of the installation frame of FIG. 3 also showing associated cable guide lines, wires and lifting cables.
Figure 5:
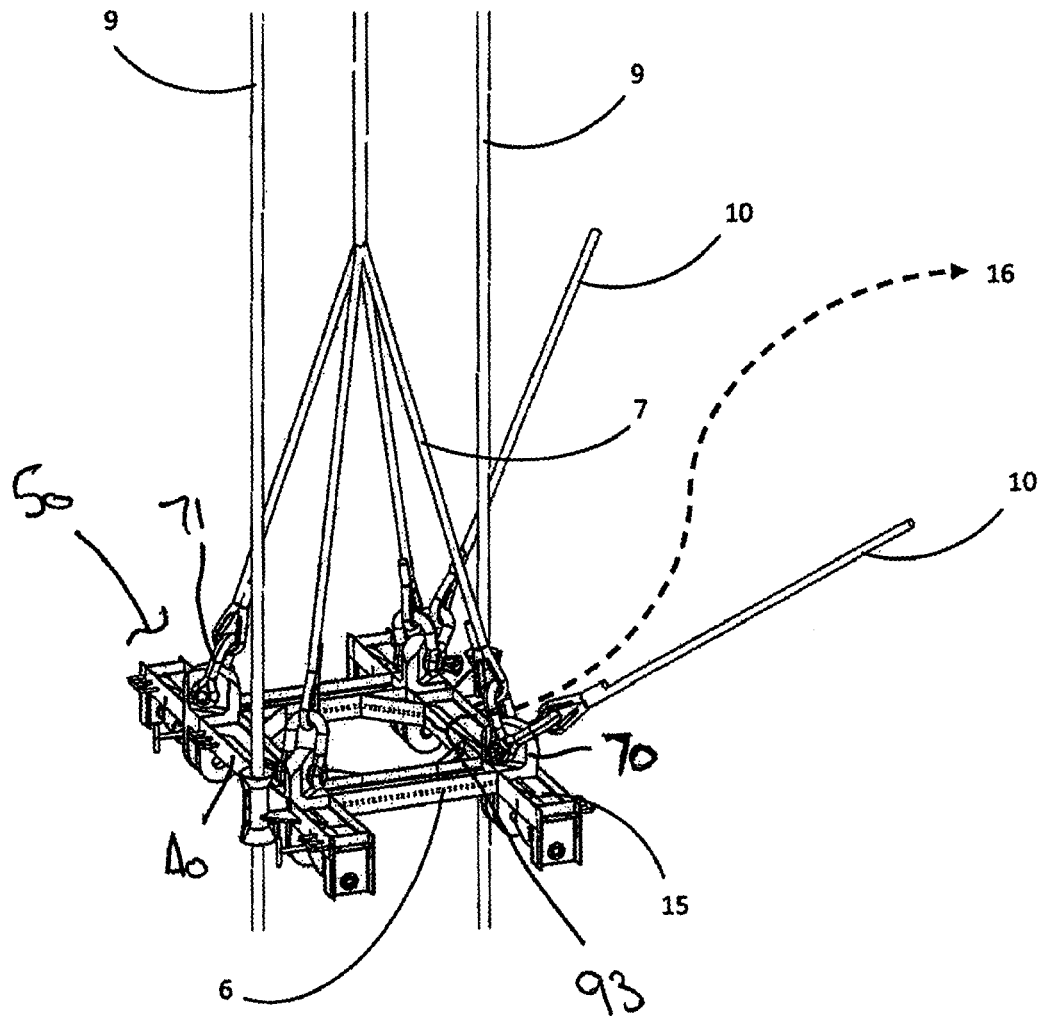
FIG. 5 is an isometric view from above and one side of the installation frame of FIG. 3 with associated cable guide lines, wires and lifting cables.
Figure 6:
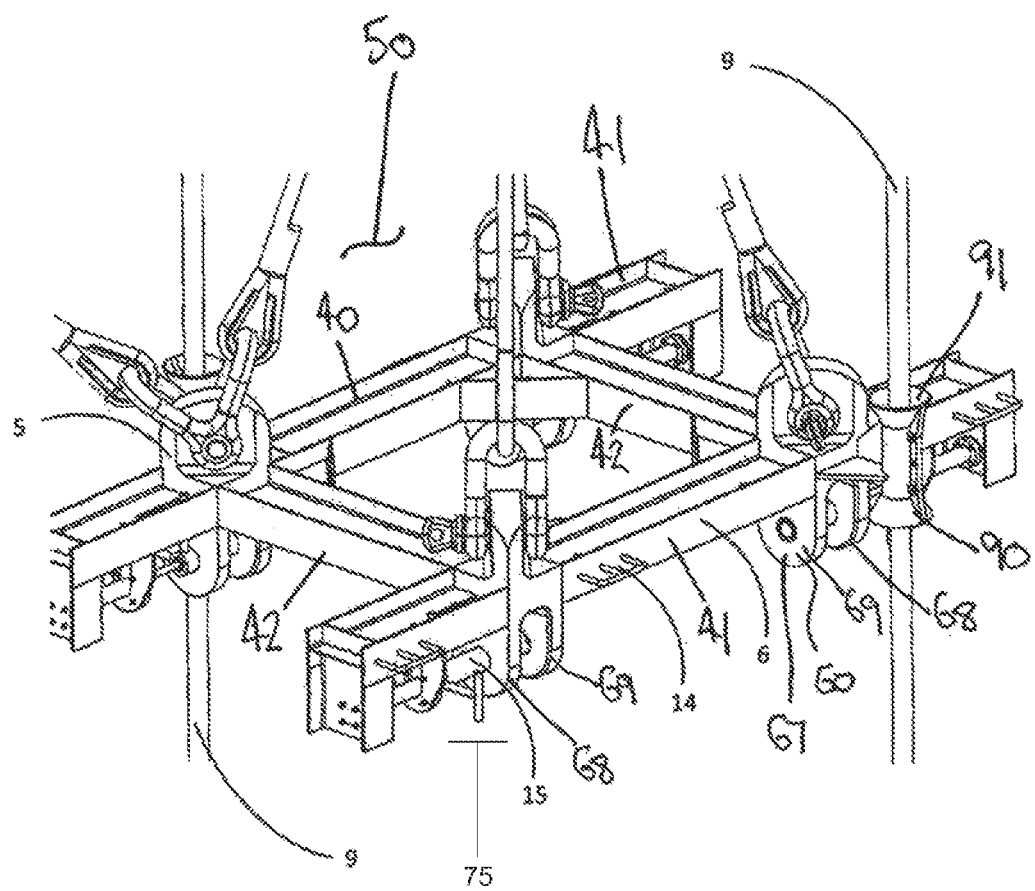
FIG. 6 is another isometric view of the installation frame of FIG. 3 and connection points for lifting cables and other ancillaries.

Referring to the drawings there is shown a deployment apparatus 50 for deploying an underwater power generator having a power generating main body 1. The power generating main body 1 when deployed, is disposed on a pylon 12 which itself is disposed on the bed of a body of water. The power generating main body 1 is in the form of a sealed nacelle 51 which houses power generating equipment such as for example rotor, shaft, bearings, gearbox, electrical generator, variable speed drive (VSD), monitoring equipment, sensors and inverters/converters. The deployment apparatus 50 includes a frame 6 adapted for releasable connection to the power generating main body 1, and to that end the frame 6 includes one or more connectors 60 for releasably connecting to the power generating main body 1.

The connectors 60 are disposed on a base region 75 of the frame and are remotely operable between engaged and disengaged positions by virtue of hydraulic rams connected to a hydraulic line 16 extending from a deployment vessel to the frame 6 and a manifold 93 distributing the hydraulic fluid to the rams and connectors 60. The connectors 60 are constructed from stainless steel or other strong, durable and rust-resistant material and are load bearing so that in use they support the load of the power generating main body 1 during deployment or recovery when connector pins 15 are in an engaged position.

The power generating main body 1 includes lifting padeyes 89 on its top face to which the connectors 60 in use connect. That is, connecting pins 15 extend through the padeyes 66 and through 89 in a manner described below.

Figure 7:
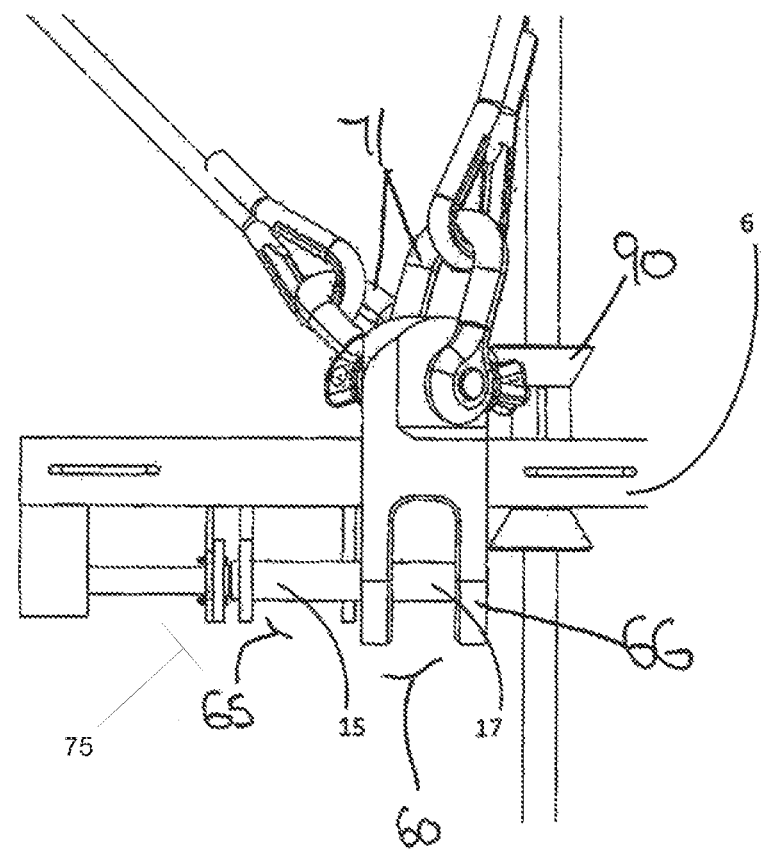
FIG. 7 is a detail elevation view of a mechanical lock mechanism associated with the installation frame of FIG. 3, the lock shown in a locked position.
Figure 8:
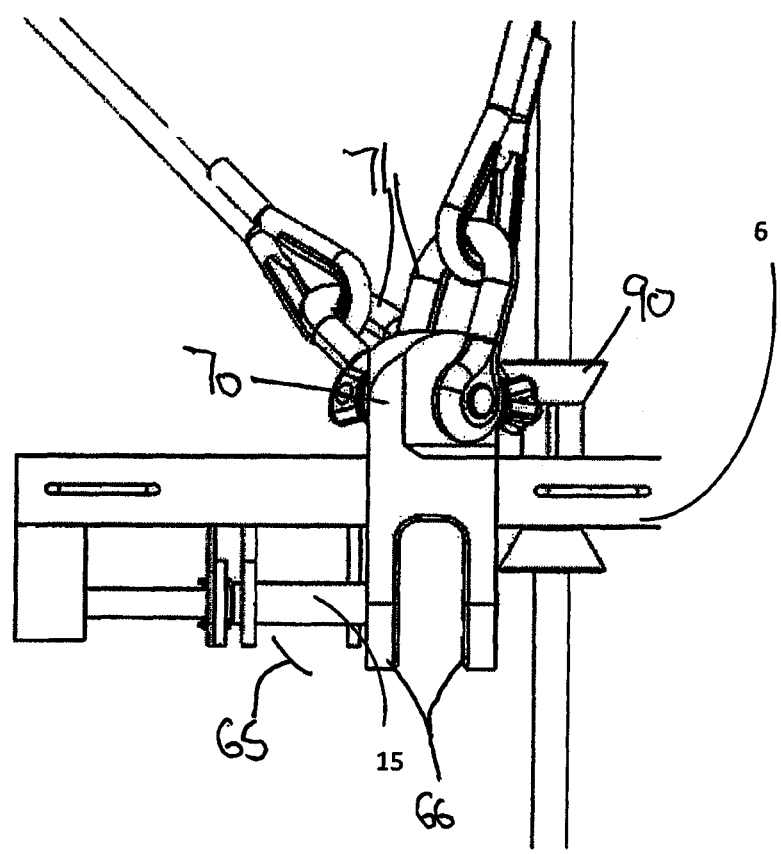
FIG. 8 is a detail elevation view of the mechanical lock mechanism of FIG. 7, the lock shown in an unlocked position.

So the connectors 60 are in the form of locks 65 which in use adopt a disengaged position (FIG. 8) and an engaged position (FIG. 7). The locks 65 include connector pins 15 receivable in receivers 66. The receivers 66 include lifting padeyes 67. The or each connector pin 15 extends from a first padeye 68 disposed on the frame 6 through a lifting padeye 89 on the upper region of the power generating main body to a second padeye 69 disposed on the frame 6 at a location spaced from the first padeye 68 when the pin 15 is in the engaged position. In this way, the pins 15 support the load of the power generating main body 1 in shear during deployment or recovery (lowering or lifting).

The connector pins 15 are extended and retracted by hydraulic rams driven by hydraulic fluid under pressure from the hydraulic line 16 extending from a deployment vessel (not shown) on the surface of the body of water (not shown).

Shear pins 99 are provided, which are constructed from nylon so that they are weaker in shear than the connector pins 15. In use, if a connector pin 15 is frozen in place for some reason, a shear pin 99 is inserted by a hydraulic ram under hydraulic power through the padeyes 67 from the connector pin 15 end so as to push the connector pin 15 out of the receivers 66. Then, the frame 6 is lifted by the deployment vessel and the shear pins 99 catastrophically fail, allowing the frame 6 to be torn away from the nacelle 51 and used in another deployment or recovery. The shear pins 99 are then replaced, which can be seen is a cheaper option than replacing the whole frame 6, and saves a lot more time.

The frame 6 includes structural elements 40 opposed and spaced apart from one another in the form of stiles and rungs 41, 42 to form a ladder-style frame. The layout of the ladder frame facilitates lifting and positioning of the power generating main body 1 since positioning cables 10 connected to the frame 6 at ends of the rungs 41, 42 (essentially at corners of the frame 6) can more easily rotate and translate the frame 6 into a selected angular and translated position.

The frame 6 includes padeyes 70 adapted to connect to lifting (deployment and recovery) cables 7. The padeyes 70 receive shackles 71 disposed at the end of cables 7. The padeyes 70 are spaced from one another on the stiles 41 to facilitate stable positioning of the power generating main body 1.

The frame 6 includes guides 90 to receive and facilitate guidance by one or more guidance cables 9. The guides 90 include one or more apertures 91 through which the guidance cables 9 extend when in use.

Figure 14:
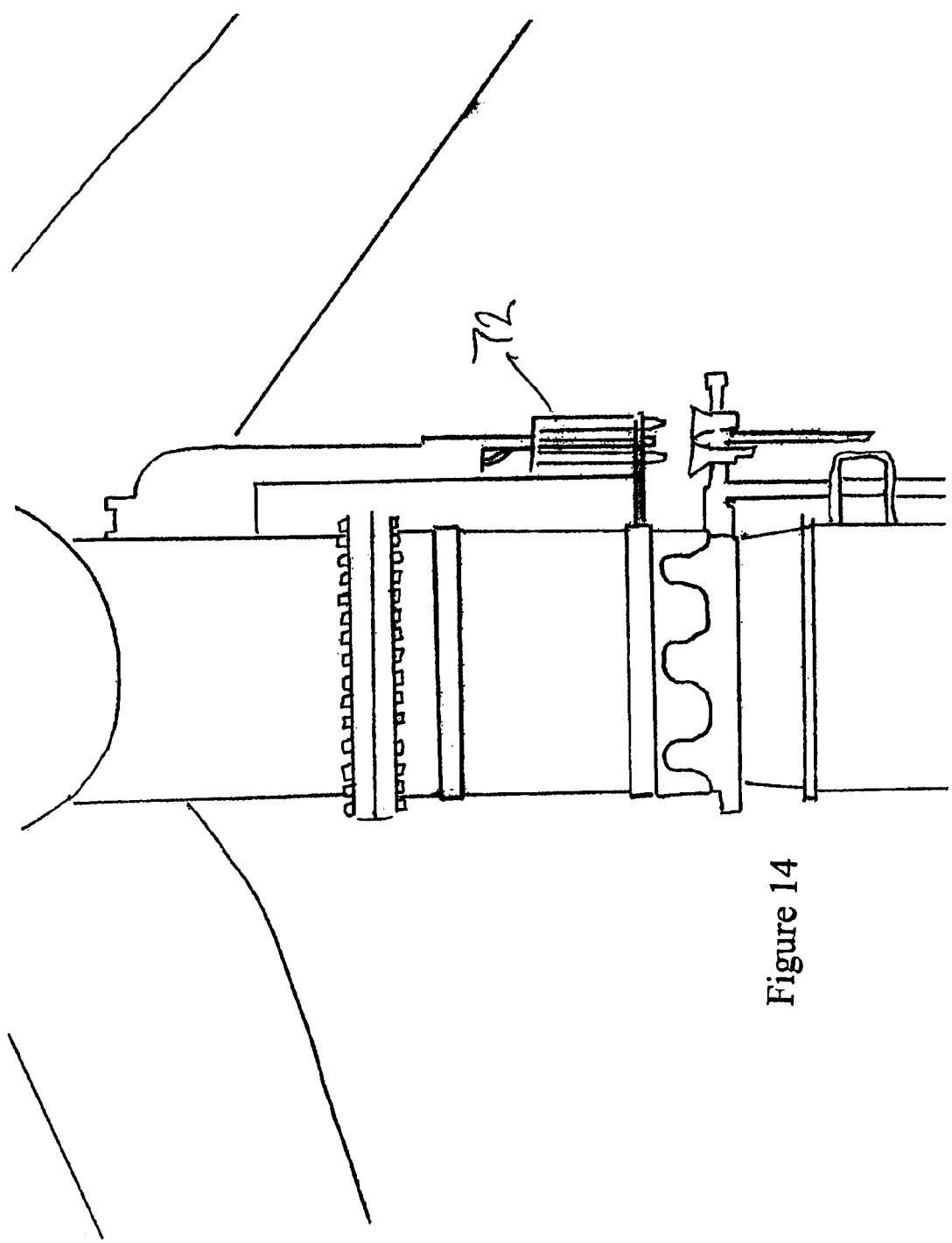
FIG. 14 is a side elevation view of a wet mating system on the underwater power generator, showing component parts of the mating system which are driven together by the hydraulic system of the deployment vessel. The vessel provides the hydraulic power to the frame manifold, which then mates the electrical system of the power generator with the electricity grid on shore.

The frame 6 includes docks 14 for docking remotely operated vehicles or ROVs (not shown). A hot stab 98 is also provided so that an ROV may dock therewith, and therefore control the extension and retraction of the pins 15 and shear pins 99, as well as controlling other functions aboard the power generating main body 51, and its associated systems such as the wet mating electrical services (FIG. 14), which the frame can control, including extension and retraction (mating and decoupling of electrical cabling to shore).

The frame 6 may include a rotating means for facilitating rotation of one portion of the frame relative to another about a vertical axis. In the arrangement shown, for this purpose positioning cables 10 are provided, connected to the frame padeyes 70.

The frame 6 includes an alignment device 88 which includes a generally conical receiver 87 supported at a central location on the frame 6 between rungs and stiles 41, 42. The alignment device is adapted to receive a boss (not shown) on the top surface of the nacelle 51 so that the padeyes 66 align with the padeyes 89 and the connector pins 15 extend easily through the padeyes 66 and connect easily to the top of the nacelle 51. This device can be seen to be particularly useful during recovery, when the frame is lowered to the power generating main body.

The frame 6 shown includes a primary actuation system which may be actuated to rotate the frame and/or extend and retract the pins 15. Furthermore, the primary actuation system is hydraulic and is actuated and controlled by hoses 16, and is actuated from the deployment vessel on the surface or a remotely operated vehicle adjacent the frame. The actuation system also includes a hot stab dock 97 which is attached to a hydraulic system and manifold associated with a wet mating system (FIG. 14) for the electrical services and cabling for transfer of generated electrical power to an on shore electrical grid. The hot stab dock 97 advantageously facilitates retraction of the wet mating system for the electrical services on the power generator during retrieval/recovery.

The deployment vessel is a dynamic positioning vessel which includes a GPS and a sophisticated positioning system using control of various propellers to maintain a selected geographic position regardless of current. Furthermore the crane can slew along the deck of the dynamic positioning vessel as well as rotate so that minor positioning adjustments can be made of the power generating main body 1 relative to the pylon 12.

For deployment the frame 6 is connected to the underwater power generator main body by the connector pins 15 extending through padeyes 66 and into locking padeye 69. Thus, the frame 6 is releasably connected to the power generating main body 1 and the weight of the power generating main body is taken by the pins 15 while the power generating main body hangs therefrom. The frame 6 is also connected to the hot stab 97 to the wet mating system 72. Then, the frame is lowered by cables 7, although it may be lowered by an arm. Visual means or sonar means disposed on an ROV or the frame, or a deployment arm, facilitate positioning of the power generating main body 1 onto the head 5 of the pylon 12. In that regard, cameras 96 and 95 are disposed on the frame, on an outward face of a ladder rung 42 to increase the field of view afforded to the camera. Electrical cabling disposed alongside the hydraulic cable 16 transmits images to operators on the deck of the deployment vessel. If the power generating main body 1 is off target relative to the pylon 12 then the operators will see the difference through a video screen and adjust the position by the cables 10 accordingly, or by slewing the crane along the deck of the deployment vessel, or advance or retard the position of the deployment vessel itself. Cameras 94 are also provided on the power generating main body 1 so that other angles may be utilised during alignment. Connection to these cameras is made possible by the hot stab 97 and a line extending alongside the hydraulic line 16.

The cables 10 facilitate rotation of the frame about the vertical axis for accurate positioning of the power generating main body 1 relative to the prevailing marine currents. The hydraulic system then remotely extends the stab 72 so that the power generating main body is connected to the shore so it can deliver electricity to the grid. Then the operator on the deployment vessel causes the frame 6 to release the connector pins to the disengaged position and the frame 6 is released from the power generating main body 1 to be drawn to the deployment vessel waiting on the surface of the water.

It may also be useful to deploy the frame 6 along guidance cables 9 which are connected at their lower end to the support structure 12, 13. To attach the cables to the lower end, an ROV is deployed and then the cables are tightened. The support structure generally weighs in the vicinity of 1200 tonnes so it forms a solid base. This kind of cable deployment can in certain circumstances facilitate positioning and can ameliorate the need for visual or sonar positioning. In use the guidance cables 9 are secured to the base of the pylon 12 by a sophisticated anchor point which simply releases when it is subjected to a selected rated force. Therefore, the cables 9 are simply retracted hard until that force is overcome, so that the anchor points on the support structure 12 simply release.

Figure 9:
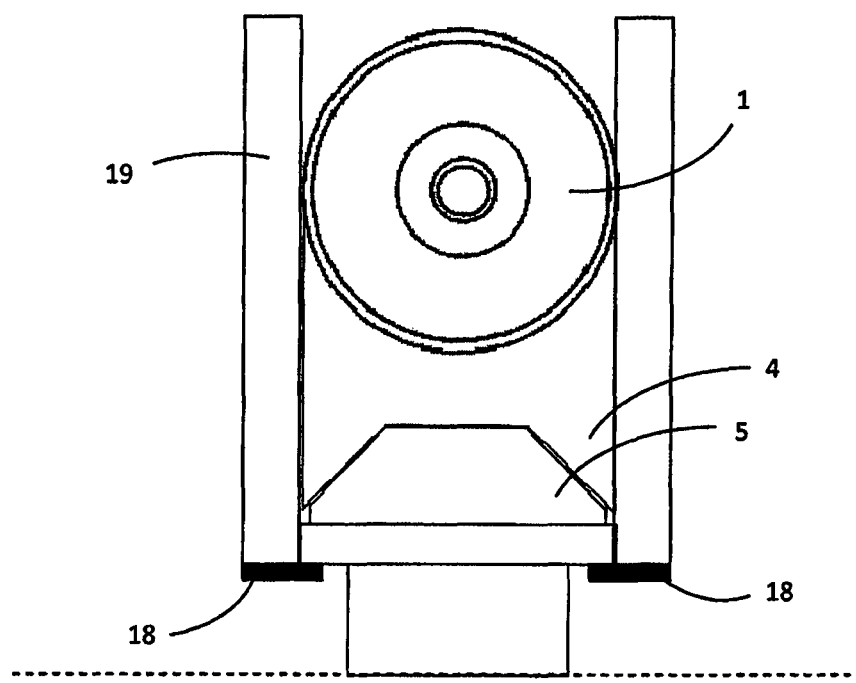
FIG. 9 is an end elevation schematic view of supplementary locks for locking the generator main body to the support pylon, the locks shown in a locked position.
Figure 10:
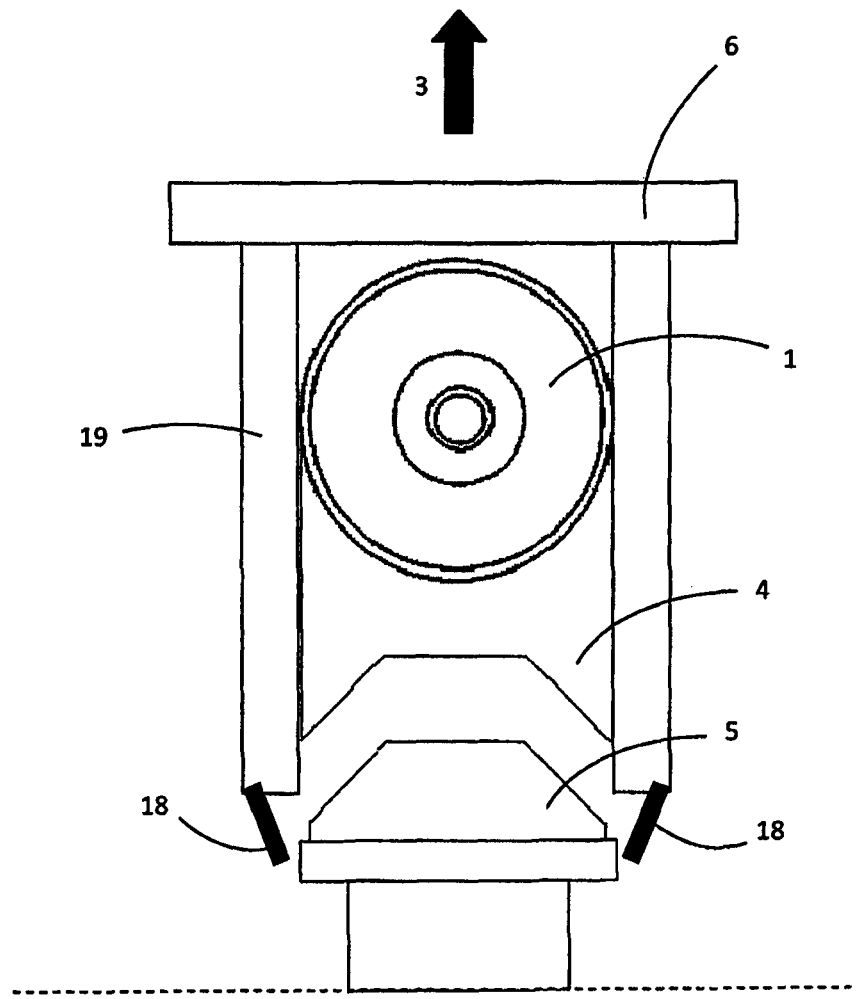
FIG. 10 is an end elevation schematic view of the supplementary locks of FIG. 9, the locks shown in an unlocked position.
Figure 11:
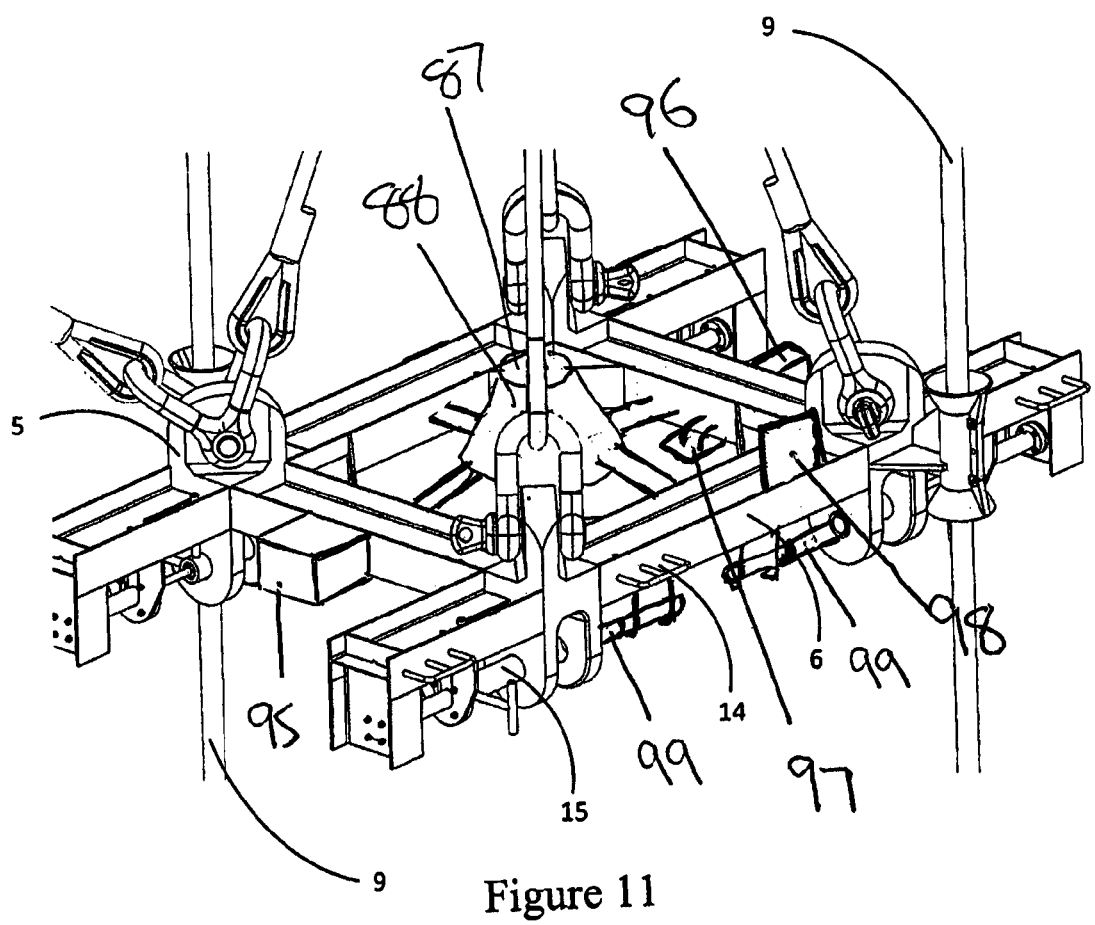
FIG. 11 is an isometric view of a deployment apparatus in accordance with another preferred embodiment of the present invention.
Figure 12:
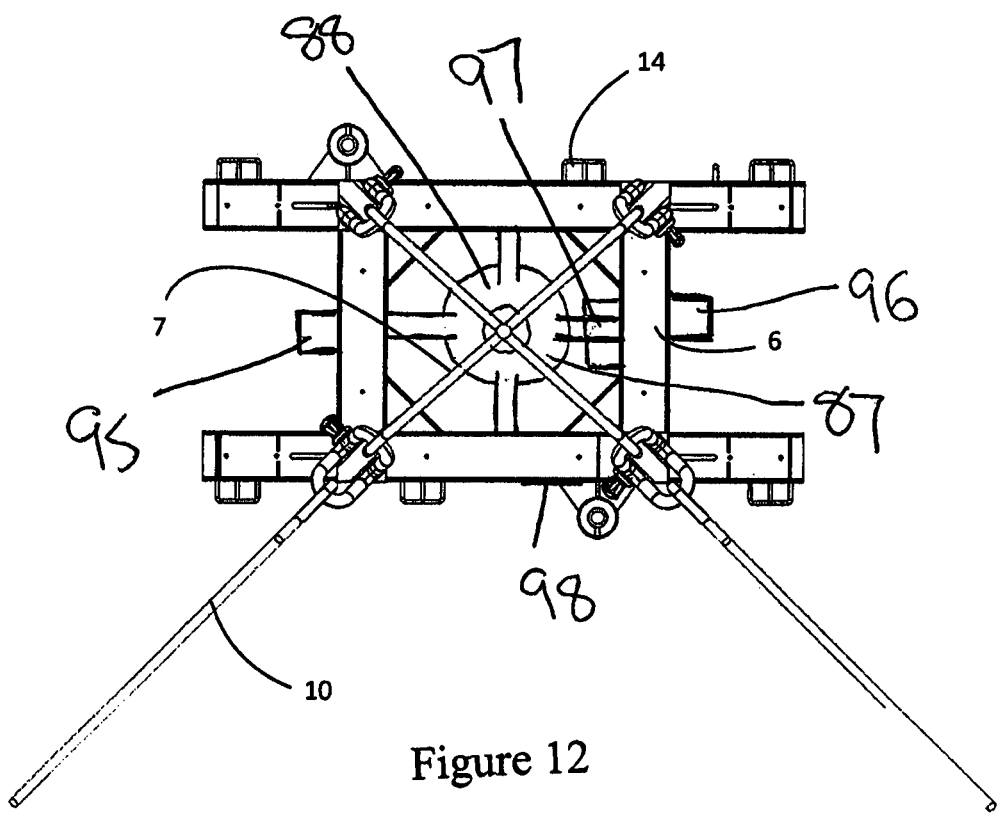
FIG. 12 is a plan view of the deployment apparatus of FIG. 11.
Figure 13:
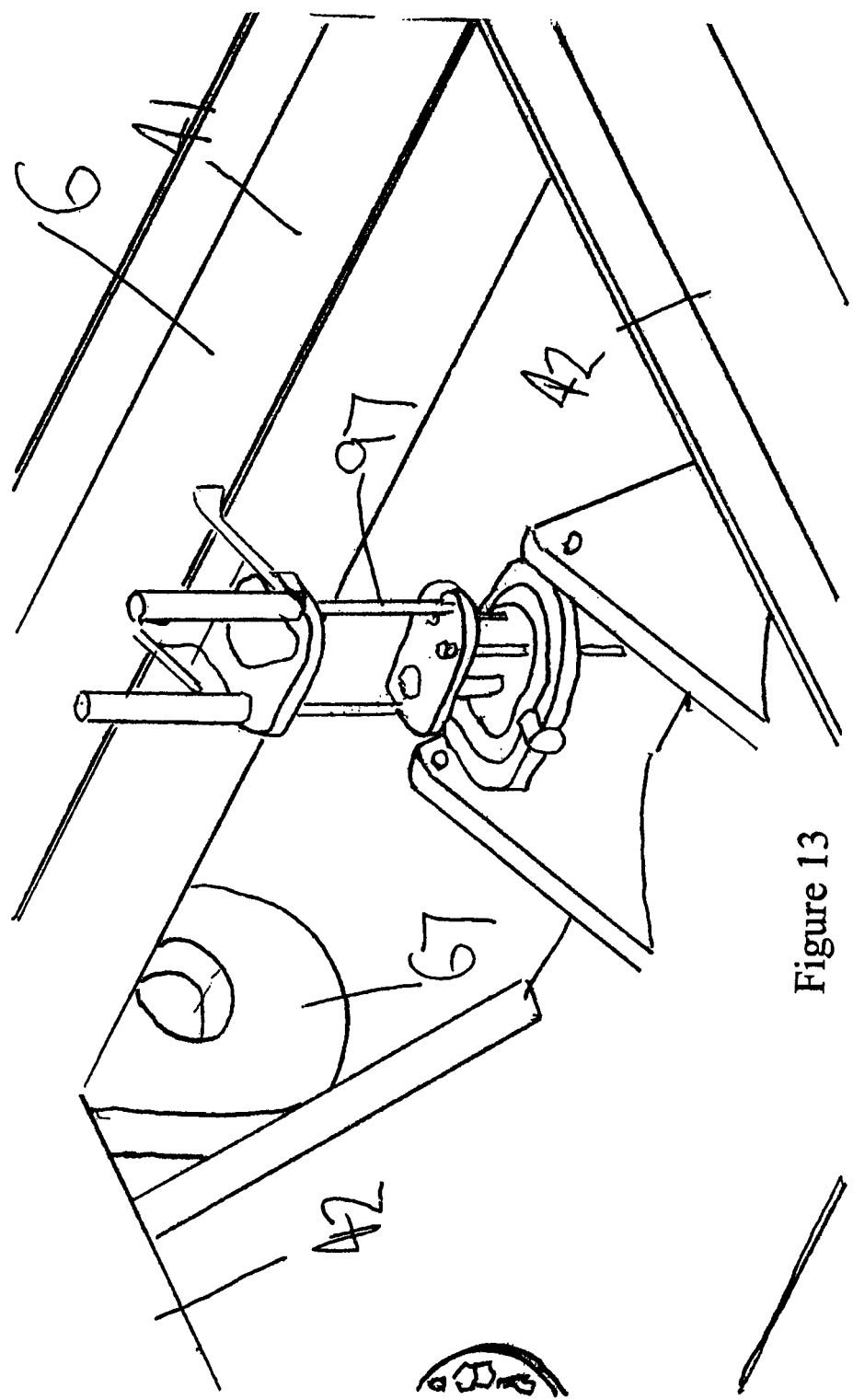
FIG. 13 is an isometric detail view of a hot stab system disposed on the deployment frame for connecting the hydraulics of the deployment vessel with the hydraulic services of the underwater power generator.

Supplementary locks 18 are provided on the power generating main body 1 to facilitate a connection between the power generating main body 1 and the head or stab 5 of the pylon 12. These locks are shown in FIG. 9 in the locked position. The frame 6 in some embodiments (using the hot stab 97) can actuate and/or release these supplementary locks 18. The frame 6 in the embodiment shown in FIG. 10 is shown to be actuating the locks so that they move to an unlocked position for removal of the power generating main body 1.

During deployment, if a hydraulic lock fails to open via a command from the deployment or recovery vessel, an ROV may be deployed to dock with the frame and operate the hydraulic locks by docking with the frame at a dock 14 and stab 98 and interfacing with the hydraulic system. Alternatively, the deployment vessel may be able to send a command to extend nylon or weakened shear pins 99 through the padeyes 66 from the end of the connecting pins 15, such that the shear pin may be easily sheared off to tear away the frame 6 from the nacelle 51. Thus, there are advantageously three redundancies built into the release system.

Retrieval of the power generating main body 1 can be effected by a reversal of the above procedure. In retrieval, the power generating main body 1 travels in the direction or arrow 3, and in deployment, the power generating main body 1 travels in the direction of arrow 2. Thus, the frame 6 is lowered during a time of low tidal current flow, the cameras showing the alignment situation of the frame relative to the power generating main body. The alignment device 88 facilitates precise connection to the power generating main body. The hot stab 97 connects, then retracts the stab 72, then the operator extends the pins 15 through the padeyes 89 and the frame padeyes 66, then draws the cable 7 upwards to the surface of the body of water.

The word 'comprising' and forms of the word 'comprising' as used in this description and claims do not limit the invention claimed to exclude any variants or additions.

Modifications and improvements to the invention will be readily apparent to those skilled in the art. Such modifications and improvements are intended to be within the scope of this invention.

The invention claimed is:

1. A deployment apparatus for deploying an underwater power generator having a power generating main body from a deployment vessel disposed on a surface of a body of water onto a pylon disposed on a bed of the body of water, the deployment apparatus comprising:
    a frame,
        in use, the frame disposed on a generally horizontal plane,
        the frame including spaced-apart structural elements on the plane, the spaced-apart structural elements in the form of stiles or rungs such that at least a portion of the frame is in the form of a ladder frame,
    the frame configured to facilitate positioning of the power generating main body by a positioning cable,
    one or more connectors disposed on a base region of the frame, the connectors for releasable connection to catches disposed on an upper region of the power generating main body, the connectors being remotely operable between a connected position in which the connectors are engaged with the catches and a disconnected position in which the connectors are disengaged from the catches; and
    one or more cameras disposed on the frame for providing visual guidance to the deployment vessel of the position of the underwater power generator relative to the pylon.

2. The deployment apparatus in accordance with claim 1 wherein the frame includes guides disposed on the frame for receiving guide cables in use connected to a base region of the pylon so that in use the frame may be lowered down the guide cables into a selected position.

3. The deployment apparatus in accordance with claim 2 wherein the guides include one or more apertures through which the guide cables extend when in use.

4. The deployment apparatus in accordance with claim 1 wherein the connectors include load-bearing connector pins receivable in the catches.

5. The deployment apparatus in accordance with claim 4 wherein the catches include lifting padeyes.

6. The deployment apparatus in accordance with claim 5 wherein each of the load-bearing connector pins extend from a first padeye disposed on the frame to a second padeye disposed on the frame at a location spaced from the first padeye when that load-bearing connector pin is in the connected position.

7. The deployment apparatus in accordance with claim 5 wherein the load-bearing connector pins may be ejected from their engaged position by shear pins wherein in use, the shear pins are inserted through the padeyes instead of the locking pins.

8. The deployment apparatus in accordance with claim 4 wherein the load-bearing connector pins are actuated by hydraulic fluid under pressure delivered by a hydraulic line extending from the deployment vessel on the surface of the body of water to the frame.

9. The deployment apparatus in accordance with claim 8 wherein the frame includes a hot stab connection for connecting the hydraulic line to the power generating main body so that the deployment vessel may power other services on the underwater power generator.

10. The deployment apparatus in accordance with claim 9 wherein the other services include a hydraulic circuit which facilitates the extension and retraction of a wet mating device so that electrical services are connected between the power generating main body and an electricity grid on shore.

11. The deployment apparatus in accordance with claim 9 wherein the other services include an electrical system for connecting and powering cameras disposed on the power generating main body.

12. The deployment apparatus in accordance with claim 1 wherein the frame includes an alignment device for aligning the frame with the power generating main body during recovery of the power generating main body, the alignment device including at least one generally conical receiver on the frame to receive a boss on the power generating main body.

13. The deployment apparatus in accordance with claim 12 wherein the generally conical receiver is disposed at a central region of the frame.

14. The deployment apparatus in accordance with claim 1 wherein the frame includes docks for docking submersible remotely operated vehicles (ROVs).

15. The deployment apparatus in accordance with claim 1 wherein the one or more cameras are video cameras and are disposed on the rungs on an outward-facing portion of the rungs to facilitate a wide field of view of the power generating main body.

16. The deployment apparatus in accordance with claim 1 wherein the one or more cameras are electrically connected to the deployment vessel by an electrical cable extending from the deployment vessel to the frame to facilitate images being sent to the deployment vessel.

17. A method of deploying an underwater power generator from a deployment vessel to a pylon disposed on a bed of a body of water, the method comprising:
  releasably connecting a lower region of a frame of a deployment apparatus according to claim 1 to an upper region of a power generating main body;
  lowering the frame and power generating main body onto the pylon;
  relaying images of the relative positioning of the power generating main body and the pylon so as to provide feedback on the progress of the lowering step; and
  remotely releasing the frame from the power generating main body.

18. The method of claim 17, further comprising:
  holding the deployment vessel in a selected position by using a GPS-enabled dynamic positioning system to facilitate the accurate positioning of the deployment vessel without the use of an anchor.

19. The method of claim 17, further comprising:
  slewing a crane along a deck of the dynamic positioning vessel to alter the positioning of the power generating main body relative to the pylon.

20. A deployment apparatus for deploying an underwater power generator having a power generating main body from a deployment vessel disposed on a surface of a body of water onto a pylon disposed on a bed of the body of water, the deployment apparatus comprising:
  a frame,
    in use, the frame disposed on a generally horizontal plane,
    the frame including spaced-apart structural elements on the plane,
    one or more connectors disposed on a base region of the frame, the connectors for releasable connection to catches disposed on an upper region of the power generating main body, the connectors being remotely operable between a connected position in which the connectors are engaged with the catches and a disconnected position in which the connectors are disengaged from the catches,
    the frame including guides disposed on the frame for receiving guide cables, which, in use are connected to a base region of the pylon so that in use the frame may be lowered down the guide cables into a selected position; and
  one or more cameras disposed on the frame for providing visual guidance to the deployment vessel of the position of the underwater power generator relative to the pylon.

* * * * *